US009698975B2

(12) United States Patent
Nagarajan et al.

(10) Patent No.: US 9,698,975 B2
(45) Date of Patent: Jul. 4, 2017

(54) KEY MANAGEMENT ON DEVICE FOR PERIMETERS

(75) Inventors: Sivakumar Nagarajan, Ottawa (CA); Srdan Dikic, Waterloo (CA); Mark A. McConnaughay, Waterloo (CA); Christopher Lyle Bender, Kitchener (CA); Marius Bozsitz, Waterloo (CA)

(73) Assignees: BlackBerry Limited, Waterloo (CA); 2236008 Ontario Inc., Waterloo (CA)

( * ) Notice: Subject to any disclaimer, the term of this patent is extended or adjusted under 35 U.S.C. 154(b) by 123 days.

(21) Appl. No.: 13/397,413

(22) Filed: Feb. 15, 2012

(65) Prior Publication Data

US 2013/0212392 A1    Aug. 15, 2013

(51) Int. Cl.
*H04L 9/30*    (2006.01)
*H04L 9/08*    (2006.01)

(52) U.S. Cl.
CPC .......... *H04L 9/0825* (2013.01); *H04L 9/0863* (2013.01); *H04L 9/0891* (2013.01); *H04L 9/0894* (2013.01)

(58) Field of Classification Search
CPC ... H04L 9/0825; H04L 9/0894; H04L 9/0891; H04L 9/0863
USPC ....................................................... 380/286
See application file for complete search history.

(56) References Cited

U.S. PATENT DOCUMENTS

| | | |
|---|---|---|
| 4,945,556 A | 7/1990 | Namekawa |
| 5,757,920 A * | 5/1998 | Misra ...................... G06F 21/33 705/76 |
| 5,864,765 A | 1/1999 | Barvesten |
| 5,987,440 A | 11/1999 | O'Neil et al. |
| 5,987,611 A | 11/1999 | Freund |
| 6,052,735 A | 4/2000 | Ulrich et al. |
| 6,105,132 A | 8/2000 | Fritch et al. |
| 6,230,272 B1 * | 5/2001 | Lockhart ................. G06F 21/62 726/2 |
| 6,233,446 B1 | 5/2001 | Do |
| 6,292,798 B1 | 9/2001 | Dockter et al. |

(Continued)

FOREIGN PATENT DOCUMENTS

| | | |
|---|---|---|
| CA | 2240880 | 12/1998 |
| CN | 101523878 A | 9/2009 |

(Continued)

OTHER PUBLICATIONS

U.S. Appl. No. 10/524,353, office action dated Sep. 21, 2012.

(Continued)

*Primary Examiner* — Saleh Najjar
*Assistant Examiner* — Devin Almeida
(74) *Attorney, Agent, or Firm* — Moffat & Co.

(57) ABSTRACT

There is provided a method and apparatus for resetting a password for a device or managing the device, the device having an encryption perimeter. A device shares a public/private key pair with a server, the public key being on the device and the private key being on the server. An intermediate value is encrypted on the mobile device using the public key. If the password is lost or the device needs to be managed, the server can request the encrypted intermediate value, decrypt it, and send the decrypted value to the mobile device which may then resume operations. A new password may be provided by the server or the user may set a new password once the encryption key is recreated from the decrypted intermediate value.

19 Claims, 6 Drawing Sheets

(56) References Cited

U.S. PATENT DOCUMENTS

| | | |
|---|---|---|
| 6,351,816 B1 | 2/2002 | Mueller et al. |
| 6,360,322 B1* | 3/2002 | Grawrock .................... 713/176 |
| 6,405,202 B1 | 6/2002 | Britton et al. |
| 6,412,070 B1 | 6/2002 | Van Dyke et al. |
| 6,490,680 B1 | 12/2002 | Scheidt et al. |
| 6,516,421 B1 | 2/2003 | Peters |
| 6,647,388 B2 | 11/2003 | Numao et al. |
| 6,668,323 B1 | 12/2003 | Challener et al. |
| 6,757,821 B1 | 6/2004 | Akiyama et al. |
| 6,772,350 B1 | 8/2004 | Belani et al. |
| 6,795,688 B1 | 9/2004 | Plasson et al. |
| 6,795,967 B1 | 9/2004 | Evans et al. |
| 6,886,038 B1 | 4/2005 | Tabbara et al. |
| 6,957,330 B1 | 10/2005 | Hughes |
| 6,978,385 B1* | 12/2005 | Cheston .................. G06F 21/31 340/5.85 |
| 6,999,562 B2 | 2/2006 | Winick |
| 7,246,374 B1 | 7/2007 | Simon et al. |
| 7,331,058 B1 | 2/2008 | Gladney |
| 7,400,878 B2 | 7/2008 | Hassan et al. |
| 7,574,200 B2 | 8/2009 | Hassan et al. |
| 7,734,284 B2 | 6/2010 | Adams et al. |
| 7,869,789 B2 | 1/2011 | Hassan et al. |
| 8,074,078 B2 | 12/2011 | Brown et al. |
| 8,515,068 B2* | 8/2013 | Brown .................. H04L 9/3271 380/255 |
| 2001/0047485 A1 | 11/2001 | Brown et al. |
| 2002/0019944 A1 | 2/2002 | Kou |
| 2002/0031230 A1 | 3/2002 | Sweet et al. |
| 2002/0087880 A1 | 7/2002 | Rhoades et al. |
| 2002/0095414 A1 | 7/2002 | Barnett et al. |
| 2002/0095497 A1 | 7/2002 | Satagopan et al. |
| 2002/0112155 A1 | 8/2002 | Martherus et al. |
| 2003/0005317 A1 | 1/2003 | Audebert et al. |
| 2003/0026220 A1 | 2/2003 | Uhlik et al. |
| 2003/0065676 A1 | 4/2003 | Gbadegesin et al. |
| 2003/0093698 A1 | 5/2003 | Challener et al. |
| 2003/0120948 A1 | 6/2003 | Schmidt et al. |
| 2003/0126437 A1 | 7/2003 | Wheeler et al. |
| 2003/0163685 A1 | 8/2003 | Paatero |
| 2003/0177389 A1 | 9/2003 | Albert et al. |
| 2003/0226015 A1 | 12/2003 | Neufeld et al. |
| 2003/0236983 A1 | 12/2003 | Mihm |
| 2004/0001101 A1 | 1/2004 | Trajkovic et al. |
| 2004/0083382 A1 | 4/2004 | Markham et al. |
| 2004/0100983 A1 | 5/2004 | Suzuki et al. |
| 2004/0209608 A1 | 10/2004 | Kouznetsov et al. |
| 2005/0154935 A1 | 7/2005 | Jin |
| 2005/0164687 A1 | 7/2005 | DiFazio |
| 2005/0210270 A1 | 9/2005 | Rohatgi et al. |
| 2005/0245272 A1 | 11/2005 | Spaur et al. |
| 2006/0059556 A1 | 3/2006 | Royer |
| 2006/0070114 A1 | 3/2006 | Wood et al. |
| 2006/0129848 A1 | 6/2006 | Paksoy et al. |
| 2006/0129948 A1 | 6/2006 | Hamzy et al. |
| 2006/0156026 A1 | 7/2006 | Utin |
| 2006/0212589 A1 | 9/2006 | Hayer et al. |
| 2006/0242415 A1 | 10/2006 | Gaylor |
| 2007/0073694 A1 | 3/2007 | Picault et al. |
| 2007/0277127 A1 | 11/2007 | Carlson |
| 2008/0081609 A1 | 4/2008 | Burgan et al. |
| 2008/0222711 A1 | 9/2008 | Michaelis |
| 2010/0319053 A1 | 12/2010 | Gharabally |
| 2011/0145833 A1 | 6/2011 | De Los Reyes et al. |
| 2011/0314467 A1 | 12/2011 | Pearson |
| 2012/0017078 A1 | 1/2012 | Reno et al. |
| 2012/0054853 A1 | 3/2012 | Gupta et al. |
| 2012/0202527 A1 | 8/2012 | Obradovich et al. |
| 2013/0145160 A1 | 6/2013 | Bursell |

FOREIGN PATENT DOCUMENTS

| | | |
|---|---|---|
| EP | 0973350 | 1/2000 |
| GB | 2408179 A | 5/2005 |
| WO | 9905814 A2 | 2/1999 |
| WO | 0059225 | 10/2000 |
| WO | 2005045550 A2 | 5/2005 |
| WO | 2009014975 A1 | 1/2009 |

OTHER PUBLICATIONS

Owen, Russell N., U.S. Appl. No. 10/524,353; filed: Feb. 14, 2005; Title: System and Method for Secure Control of Resources of Wireless Mobile Communication Device.

Bender, Christopher Lyle, U.S. Appl. No. 13/074,136; filed Mar. 29, 2011; Title: Data Source Based Application Sandboxing.

International Application No. PCT/CA 03/01245, International Search Report dated Dec. 23, 2003.

International Application No. PCT/CA 03/01245, PCT Written Opinion, dated Apr. 23, 2004.

International Application No. PCT/CA 03/01245, PCT Written Opinion, dated Sep. 20, 2004.

International Application No. PCT/CA03/01245, PCT International Preliminary Examination Report, dated Nov. 29, 2004.

Owen, Russell N., U.S. Appl. No. 13/371,093; filed: Feb. 10, 2012; Title: System and Method for Secure Control of Resources of Wireless Mobile Communication Device.

Owen, Russell N., U.S. Appl. No. 10/524,353; filed: Aug. 19, 2003; Title: System and Method for Secure Control of Resources of Wireless Mobile Communication Devices.

EP Application No. 12155659.1, Extended European Search Report dated Jan. 8, 2012.

U.S. Appl. No. 13/098,456, Office Action dated Sep. 13, 2012.

Olzak, Tom, IT Security (Dec. 15, 2008) "Use free sandboxing software to isolate risky behaviour". http://www.techrepublic.com/blog/security/use-free-sandboxing-software-to-isolate-risky-behavior/693.

Wikipedia "Operating system-level virtualization" http://en.wikipedia.org/wiki/Operating_system-level_virtualization.

Wikipedia "Solaris Containers" http://en.wikipedia.org/wiki/Solaris_Containers.

Morello, John (Oct. 2006). "Communication & Collaboration: Building an Emergency Operations Center on Groove and SharePoint". TechNet Magazine. Microsoft Corporation. http://technet.microsoft.com/en-us/magazine/2006.10.grooveandsharepoint.aspx.

Microsoft SharePoint Workspace http://en.wikipedia.org/wiki/Microsoft_SharePoint_Workspace.

Chou, Yung (Oct. 2006). "Communication & Collaboration: Get into the Groove: Solutions for Secure and Dynamic Collaboration". Tech Net Magazine. Microsoft Corporation. http://technet.microsoft.com/en-us/magazine/2006.10.intothegroove.aspx.

Lawson, Stephen, IDG News (Mar. 24, 2011) "PlayBook Will Need BlackBerry Tethering, to Start". PCWorld. http://www.pcworld.com/article/223274/playbook_will_need_blackberry_tethering_to_start.html.

Atkins, Lucas (Mar. 11, 2011) "First Look at BlackBerry Mobile HotSpot, Tethering for OS 6.1". http://n4bb.com/5027/first-look-at-blackberry-mobile-hotspot-tethering-os-6-1.

Hamblen, Matt, Computerworld (Jan. 13, 2011) "PlayBook to allow tethering to BlackBerry smartphones" http://www.computerworld.com/s/article/9204960/PlayBook_to_allow_tethering_to_BlackBerry_smartphones.

PCT application No. PCT/CA2011/001058, International Search Report and the Written Opinion of the International Searching Authority mailed Dec. 21, 2011.

Wikipedia, "Disk encryption" retrieved from http://en.wikipedia.org/wiki/Full_disk_encryption.

Extended European Search Report mailed Jul. 13, 2012, in corresponding European patent application No. 12153439.0.

"Customizing User Interaction in Smart Phones", Pervasive Computing, IEEE CS (2006) pp. 81-90 (URL: http://www.idi.ntnu.no/grupper/su/bibliography/pdf/2006/Korpipaa2006pc.pdf).

"Supporting Mobile Privacy and Security through Sensor-Based Context Detection", Julian Seifert, Second International Workshop on Security and Privacy in Spontaneous Interaction and Mobile

(56) References Cited

OTHER PUBLICATIONS

Phone Use, May 17, 2010, Finland (URL: http://www.medien.ifi.lmu.de/iwssi2010/papers/iwssi-spmu2010-seifert.pdf).

EagleVision: A Pervasive Mobile Device Protection System, Ka Yang, Nalin Subramanian, Daji Qiao, and Wensheng Zhang, Iowa State Unviersity (URL: http://www.cs.iastate.edu/~wzhang/papers/eagleVision.pdf).

"Using context-profiling to aid access control decisions in mobile devices", Gupta et al., Nokia Research Center (URL: http://www.cerias.purdue.edu/assets/symposium/2011-posters/372-C48.pdf) Please refer to the 1-page file named 372-C48.pdf.

Smartphone Security Beyond Lock and Wipe (Jun. 10, 2010): http://www.enterprisemobiletoday.com/article.php/3887006.

Basic Access Authentication (Jan. 23, 2010): http://en.wikipedia.org/wiki/Basic_access_authentication.

Digital Access Authentication (Dec. 23, 2009): http://en.wikipedia.org/wiki/Digest_access_authentication.

Cross-site request forgery (Nov. 30, 2008): http://en.wikipedia.org/wiki/Cross-site_request_forgery.

PCT International Search Report in PCT/CA2013/000074, mailed May 17, 2013.

European Patent Office, Examination Report, Application No. 12155659.1, Nov. 7, 2013.

Wikipedia, Key Derivation Function, en.wikipedia.org/key_generation_function, Dated May 10, 2011.

Wikipedia, Key Generation, en.wikipedia.org/key_generation, Dated Dec. 23, 2009.

\* cited by examiner

KEY MANAGEMENT ON DEVICE FOR PERIMETERS

FIELD OF THE DISCLOSURE

The present disclosure relates to key and password management for computing devices in general, and in particular to key and password management for devices comprising encrypted perimeters.

BACKGROUND

Many computing devices, whether they are desktop computers or mobile devices, make extensive use of passwords to protect sensitive information and to control access to secure resources. The password may be used to control access to the device by, for example, restricting access to applications on the device until the password is correctly entered. In addition, the password may be used as part of an encryption algorithm to encrypt data on the device.

Typically, an end-user may be prompted for a password. However there are cases where a password may be lost, forgotten or compromised, or in the case of a mobile device, the device itself may be lost.

In some cases, a password may be provided to and stored on a server, which may then allow the password to be retrieved. However, in other situations it is undesirable, for security reasons, to store an unencrypted version of the password or to provide the password to the server.

In cases involving devices with encrypted perimeters having an encryption key derived from a password, a lost or forgotten password prevents data on the computing device from being retrieved. Moreover, in some cases and for security reasons, the plain-text password is not stored on the device, meaning that it is technically impossible for the computing device to perform any tasks involving the encrypted data without the password.

BRIEF DESCRIPTION OF THE DRAWINGS

Embodiments of the present disclosure will now be described, by way of example only, with reference to the attached figures, wherein.

DETAILED DESCRIPTION

Figure 1:
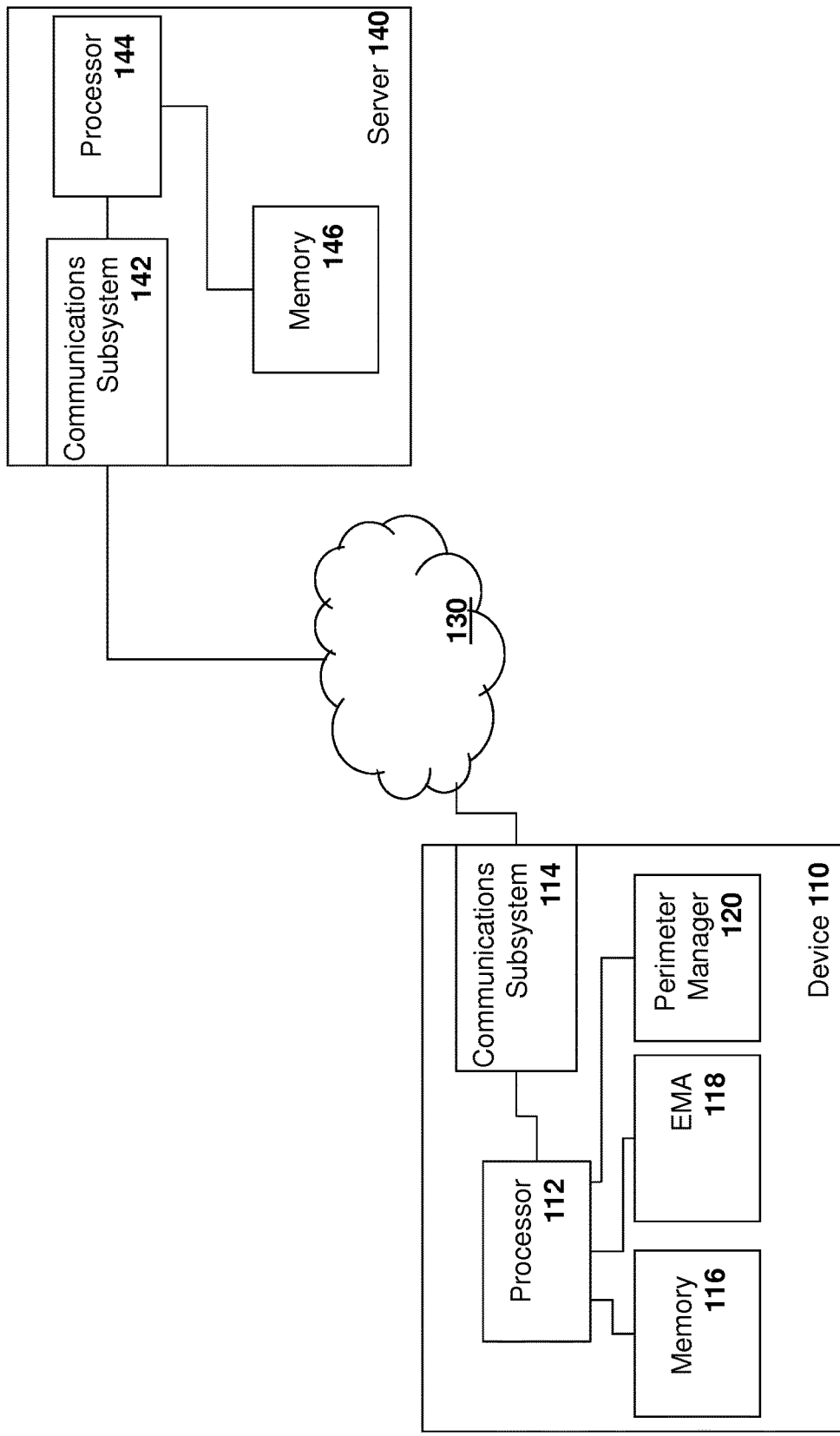
FIG. 1 is a block diagram illustrating a mobile device and server in accordance with at least one embodiment of the present disclosure.

The present disclosure provides a method, at a computing device, for enabling recovery of an encryption key, the method comprising: establishing, with a server, a public/private key pair, the public key being stored on the computing device and the private key being stored on the server; using a Password Key Derivation Function (PKDF) for computing a PKDF value at the computing device, the PKDF value being used to derive the encryption key; encrypting the PKDF value with the public key; storing the encrypted PKDF value; and deleting the password and the PKDF value from memory on the computing device, wherein the encrypted PKDF value is sent to the server for decryption to recover the encryption key.

The present disclosure further provides a method, at a server, comprising: provisioning on a computing device, a public/private key pair, the public key being stored on the computing device and the private key being stored on the server; establishing a secure channel with the computing device; sending a request to the mobile device, via a secure channel, for an encrypted Password Key Derivation Function (PKDF) value; receiving, via the secure channel, the encrypted PKDF value; decrypting the encrypted PKDF value with the private key; and sending the decrypted PKDF value to the computing device via the secure channel; wherein an encryption key on the computing device is derivable from the decrypted PKDF value.

The present disclosure further provides a computing device, comprising: a communications subsystem; a processor; and memory; wherein the communications subsystem, the processor, and the memory, cooperate to: establish, with a server, a public/private key pair, the public key being stored on the computing device and the private key being stored on the server; use a Password Key Derivation Function (PKDF) for computing a PKDF value at the computing device, the PKDF value being used to derive the encryption key; encrypt the PKDF value with the public key; store the encrypted PKDF value; and delete the password and the PKDF value from memory on the computing device.

The present disclosure further provides a server, comprising: a communications subsystem; a microprocessor; memory; wherein the communications subsystem, microprocessor and memory cooperate to: provision on a computing device, a public/private key pair, the public key being stored on the computing device and the private key being stored on the server; establish a secure channel with the computing device; send a request to the mobile device, via a secure channel, for an encrypted Password Key Derivation Function (PKDF) value; receive, via the secure channel, the encrypted PKDF value; decrypt the encrypted PKDF value with the private key; and send the decrypted PKDF value to the computing device via the secure channel; wherein an encryption key on the computing device is derivable from the decrypted PKDF value.

The present disclosure describes various methods, systems, and devices in relation to a particular environment. However, the methods, systems and devices described herein are applicable to other environments, and the present disclosure is not limited to any particular environment.

Thus, in at least one embodiment, the present disclosure relates to an environment with a mobile device comprising an encryption perimeter and a communication subsystem. The mobile device can be a cellular telephone with data capabilities, i.e., a "smart phone", a tablet, a laptop computer, or the like.

The encryption perimeter refers to data stored on the mobile device in encrypted form, using an encryption key. Broadly, there are two categories of key management for encryption perimeters: Local Key and Non-Local Key.

In the case of the Local Key, the encryption key for the encryption perimeter is typically computed from information residing on the mobile device, which allows the computing device to recreate the key. This information is stored on the device outside the encryption perimeter. A password is used to validate a user, where a hash of a password entered is compared with a stored hash of the correct password (the user password itself is not stored on the device). Once the user has been validated, the key specific to the perimeter is retrieved from a secure key store on the device. This key is then sent through a series of cryptographic hash iterations to generate an intermediate key for the encrypted perimeter. The intermediate key is then mixed in cryptographically with the device specific random data to generate the actual encryption key used to unlock the perimeter, to allow access to the data in the encrypted perimeter.

A more secure solution than the Local Key scheme is the Non-Local Key scheme. According to the Non-Local Key scheme, there is never sufficient information stored on the device, and specifically outside of the encryption perimeter, to recreate the key. For example, in a device implementing the Non-Local Key scheme, the encryption key may be derived from the user-entered password and a key generating function. Thus without the user-entered password, the device cannot recreate the key even if the device has access to the key generating function. In such a scenario, if the user loses his password, the data within the encryption perimeter is completely inaccessible. In accordance with the non-local key, once the user is validated, as with the above local key scenario, the user supplied password is sent through a series of cryptographic hash iterations to generate an intermediate key for the encrypted perimeter. This intermediate key is then mixed in cryptographically with device specific random data to generate the actual encryption key used to unlock the perimeter, to allow access to the data in the encrypted perimeter.

Figure 2:
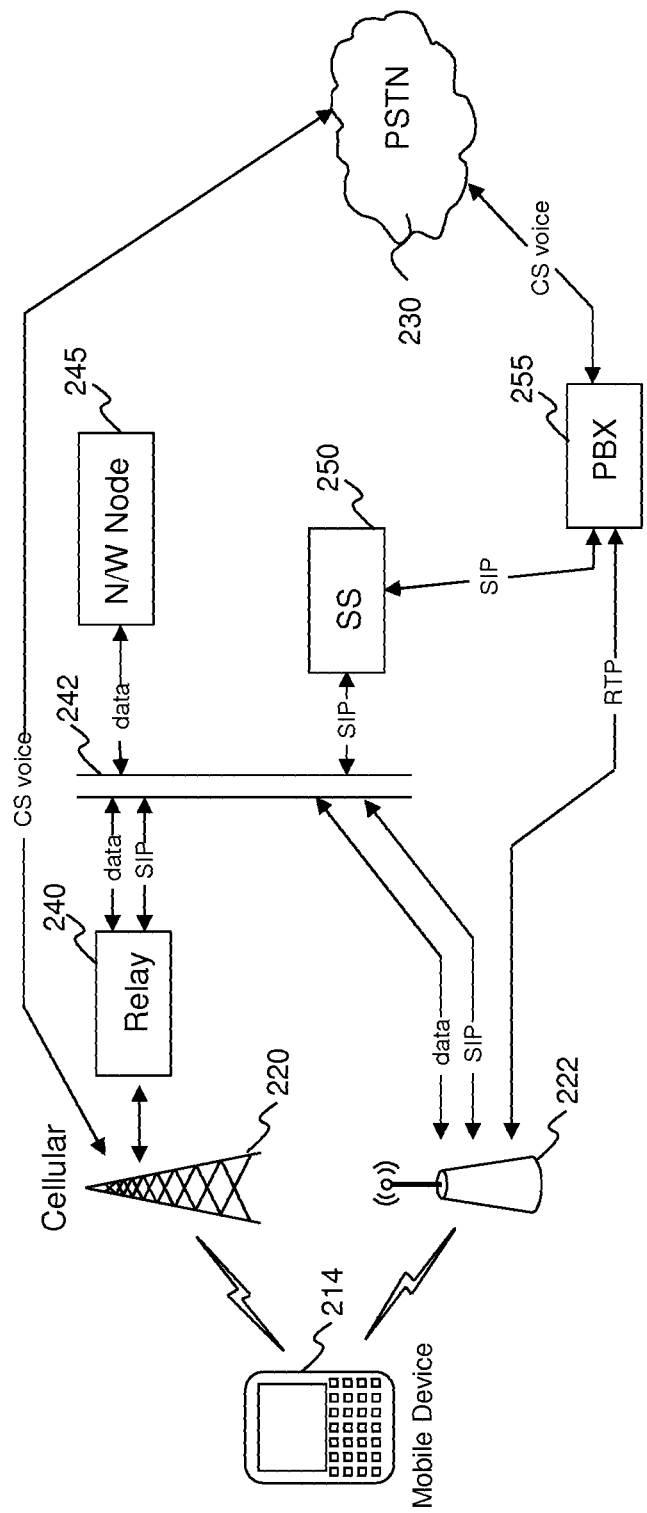
FIG. 2 is a block diagram of an example network architecture.

Reference is now made to FIGS. 1 and 2. FIG. 1 illustrates a simplified architecture for the embodiments of the present disclosure. In particular, a device 110 includes a processor 112 and a communications subsystem 114. Device 110 may be any computing device, including a desktop computer, portable computer, laptop, mobile device, tablet, gaming console, among others.

The mobile device 110 communicates with a server 140, for example through a network 130. Network 130 could be any wide area or local area network. In other embodiments device 110 may connect directly to server 140 and not use a network 130.

Server 140 includes a communications subsystem 132, a processor 144 and memory 146 in the example of FIG. 1.

Depending on the network 130, communications subsystems 114 and 142 could be any wired or wireless system.

As described below, device 110 further includes two modules, namely an Enterprise Management Agent (EMA) 118 and a perimeter manager 120. The EMA 118 is a software module which can communicate with a perimeter manager 120 on the device and with server 140 through communications subsystem 114.

One exemplary environment for the embodiment of FIG. 1 is shown with regards to FIG. 2. FIG. 2 illustrates an architectural overview for a mobile network having voice and data.

Device 110 from FIG. 1 may be mobile device 214, which in the example of FIG. 2 comprises a dual-mode mobile device that communicates both with a cellular network 220 and a data access point 222. In other examples mobile device 214 may communicate with only one of cellular network 220 or data access point 222.

Mobile device 214 may connect through cellular network 220 to provide either voice or data services. As will be appreciated, various cellular networks exist including, but not limited to, Global System for Mobile Communications (GSM), General Packet Radio Service (GPRS), Code Division Multiple Access (CDMA), Universal Mobile Telecommunications System (UMTS), Long Term Evolution (LTE), Long Term Evolution Advanced (LTE-A), Wideband Code Division Multiple Access (WCDMA), among others. These technologies allow the use of voice, data or both at one time.

A circuit switched call, as seen from FIG. 2, will proceed through a circuit switched voice channel to Public Switched Telephone Network (PSTN) 230.

Data proceeds through a relay 240, and may, in some cases, proceed through a firewall 242 to one of several servers servicing the data call.

As seen in FIG. 2, data proceeds through the firewall 242 to a network node 245, which may be server 140 from FIG. 1.

If the call is a transmission of voice over a data connection using VoIP, the data proceeds over session initiation protocol (SIP) to a SIP server 250.

From SIP server 250, the VoIP call proceeds over a private branch exchange (PBX) 255 and then becomes a circuit-switched voice call over PSTN 230.

Mobile device 214 can further communicate over a data access point for a wireless local area network (WLAN). Examples of WLAN technologies include Wireless Fidelity (WiFi) or Worldwide Interoperability for Microwave Access (WiMax) as underlying technologies of wireless local area networks.

As with the cellular connection, data can be routed through firewall 242 to either the network node 245.

In order to permit a password to be reset if lost or forgotten, or in order to allow a server to perform certain functions such as policy changes on the device while the device is locked, the present disclosure provides for the encryption and secure storage of a password while still permitting retrieval and use. In particular, reference is now made to FIG. 3, which shows a process for encryption and storage of a new password.

Figure 3:
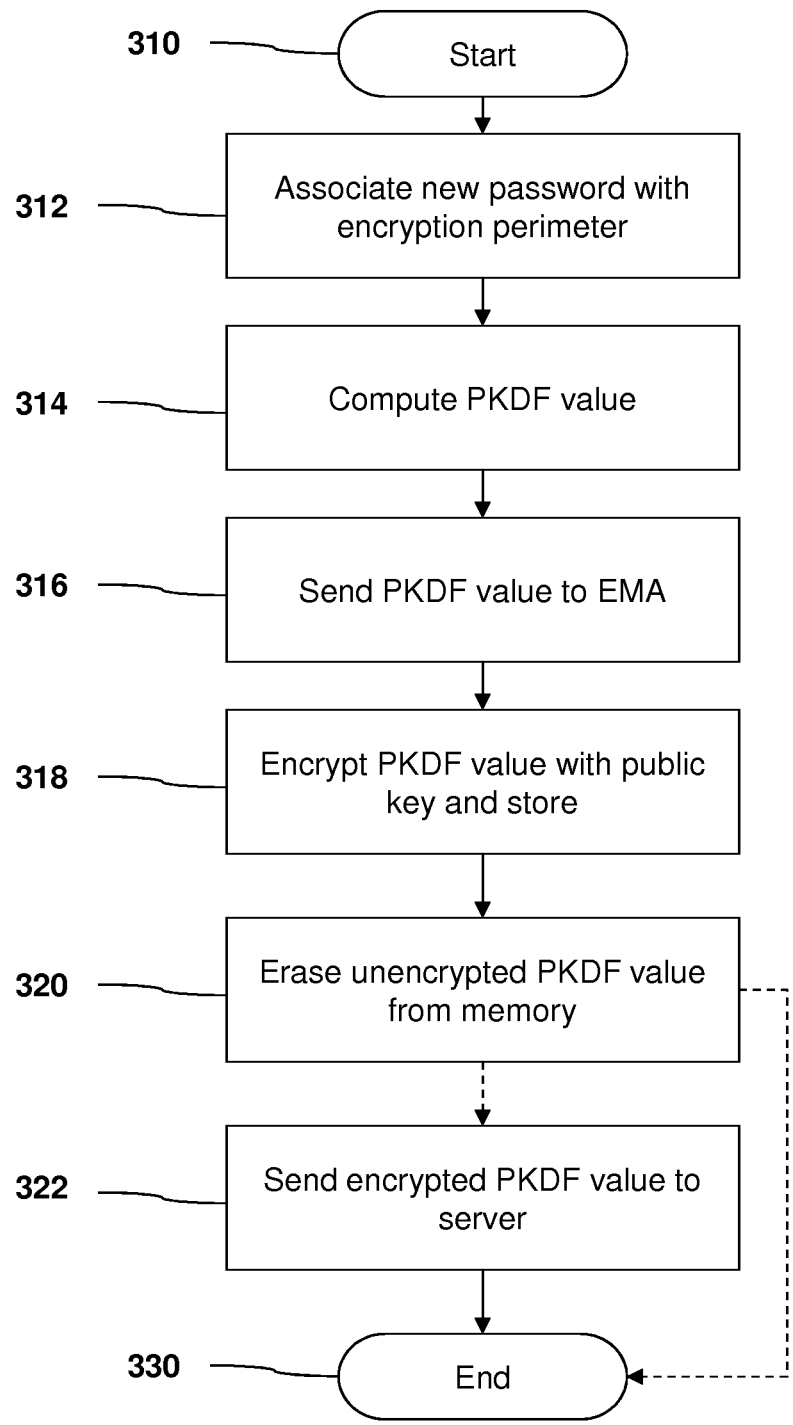
FIG. 3 is a flow chart of a process for creating and storing an encrypted PKDF value according to at least one embodiment of the present disclosure.

The process of FIG. 3 starts at block 310 and proceeds to block 312, in which a new password is associated with the encryption perimeter on the device. From block 312, the process proceeds to block 314, in which the perimeter manager 120 computes a Password Key Derivation Function (PKDF). The PKDF is any suitable function for deriving a key from a password which always provides the same output for the same input. In at least one embodiment, the PKDF is a one-way hash function.

The PKDF value does not necessarily correspond to the encryption key used for the encryption perimeter, although in at least one embodiment, it does.

In other embodiments, the PDKF value acts as an intermediate value and is further combined with device specific random data to generate the actual encryption key. In at least one embodiment, the encryption key is produced by processing the PKDF value through a series of cryptographic hash iterations.

The process then proceeds to block 316, in which the perimeter manager 120 then provides the PKDF value to the EMA 118 in a secure manner. After having communicated the PKDF value to the EMA 118, the perimeter manager discards the PKDF value from its memory. For even greater security, the PKDF value is never stored in plaintext on persistent storage in at least one embodiment.

EMA 118 shares a encryption key with server 140. In one embodiment, the encryption key is a public/private key pair in which the public key is known at the device 110 and the private key is known at server 140. The public/private key pair is, in one embodiment, unique for the particular device 110, and thus server 140 manages a public/private key pair for all devices under its management. As the server 140 may hold private keys for a number of devices, the private key may be associated to the device 110 through a device identifier.

The public-private encryption key pair may have been established at an earlier stage, such as during device activation. In other embodiments, the public-private encryption key pair is established when the EMA 118 establishes a connection with the server 140. Other options are possible.

At block 318, EMA 118 encrypts the PKDF value using the public key, and may store the encrypted value. The unencrypted PKDF value is then discarded and erased from the device memory at block 320.

From block 320, the device may optionally provide the encrypted PKDF value to the server, as seen in block 322. In particular, at block 322, the EMA 118 communicates the encrypted PKDF value to server 140 via a secure communication channel. In at least one embodiment, the secure communication channel may be established using a separate public and private key pair for communication between the device and server. Other options for secure communication are possible. Once the encrypted PKDF value is sent, the process proceeds from block 322 to block 330 and ends.

Alternatively, the encrypted PKDF value may be stored on the device and not communicated to the server until required for password recovery or for device changes. In this case, the process proceeds directly from block 320 to block 330 and ends.

At this stage, device 110 only possesses the encrypted PKDF value, as the unencrypted value has been erased from the memory of EMA 118, as well as from the perimeter manager's memory. Therefore, in between sessions, the device's encryption perimeter may only be unlocked by recreating the encryption key from either the correct password, as entered by the user, or the encrypted PKDF value. Also, even if the EMA has maintained a copy of the encrypted PKDF value, it is incapable of decrypting the PKDF value as the EMA lacks the private key required for such decryption. Accordingly, in the absence of the password, the encryption key may only be recreated from a decrypted PKDF value received from the server.

Figure 4:
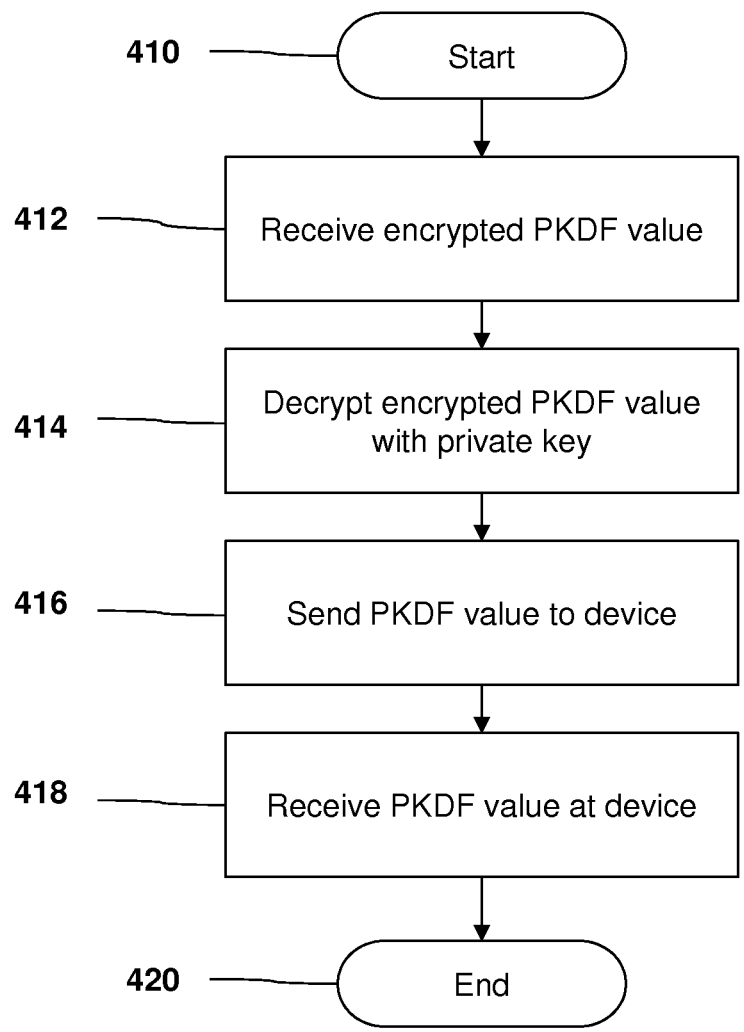
FIG. 4 is a flow chart of a process for resetting a password or managing a device according to at least one embodiment of the present disclosure.

As indicated above, if a password is lost or forgotten, the password may need to be reset. In other cases, the server may need to manage the device, for example by changing policies on the device, provisioning software to the device, among other functionality. If a local key encryption policy is used, the management of the device can occur without knowledge of the password. However, in the case of a non-local key, the PKDF value is needed to manage the device. In either case, the server may proceed in accordance with the process of FIG. 4.

The process begins at block 410 and proceeds to block 412, in which the server 140 receives the encrypted PKDF value. This may be a result of a password reset request, for example by a user contacting an administrator to reset the password. In other cases, server 140 needs to manage device 110. In one embodiment, the encrypted PKDF value is stored at the server. In another embodiment, the encrypted PKDF value is stored at device 110, in which case a secure message to retrieve the encrypted PKDF value is sent from server 140 to device 110, and the receipt of the encrypted PKDF value is shown at block 412.

From block 412, the process proceeds to block 414 in which the server 140 decrypts the encrypted PKDF value using the private key associated with device 110. The decrypted PKDF value is then transmitted securely through a secure channel to the EMA 118 on device 110, as shown at block 416. In the case of password resetting, a new password may also be sent to device 110 at block 416. In this case, the new password may be communicated through other channels securely to a user, generally once the user has been authenticated by the administrator.

For the communication at block 416, in at least one embodiment, the secure channel is established using a separate public/private key pair already shared by the device 110 and the server 140.

The EMA 118 receives the unencrypted PKDF value at block 418. Once the EMA 118 is in possession of the unencrypted PKDF value, the EMA can securely pass the PKDF value to the perimeter manager 120.

In at least one embodiment, in which the PKDF value corresponds to the encryption key, the process ends after block 418, as shown by block 420, as the perimeter manager is now in possession of the encryption key.

In other embodiments, the encryption key is produced by further processing the PKDF value, such as for example, a series of cryptographic hash iterations. In at least one embodiment, the PKDF value, or the PKDF value after a series of cryptographic hash iterations, is further transformed using device specific random data.

In this manner, the perimeter manager 120 can recreate the encryption key without the password, and unlock the encryption parameter even in the event that the user has lost his password. The new password is then provided to the device 110, and the process of FIG. 3 is repeated with the new password.

The above method, device and system have been described with reference to a specific example. However, the present teachings can be adapted or modified while still remaining within the scope of the present disclosure.

Figure 5:
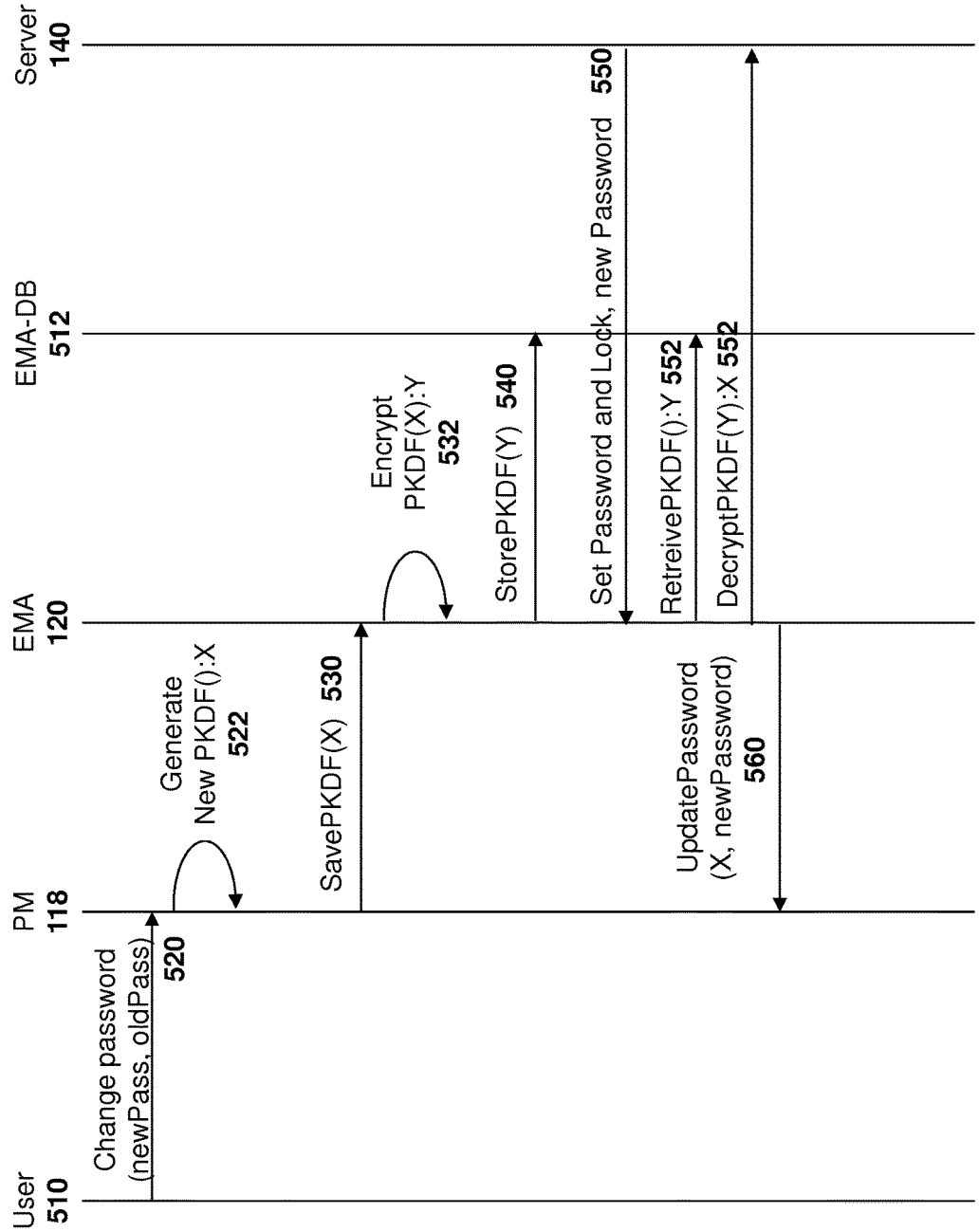
FIG. 5 is a data flow diagram showing communications between various logical entities according to at least one embodiment of the present disclosure.

A flow diagram illustrating the communications between the various entities is shown with regard to FIG. 5.

In particular, when a user 510 wants to change a password, the user will typically log in to the device using the old password and through a password management application enter a new password. In some cases the old password must be provided as well. This is shown by message 520.

The device, and in particular the PM 118 receives the password change request and if the old password is authenticated then the PM generates a new PKDF value "X", as shown by arrow 522.

The PM 118 then securely communicates with EMA 120 to instruct EMA 120 to save PKDF (X), as shown by arrow 530.

EMA 120 encrypts PKDF (X) with a public key, as described above, to produce an encrypted value "Y", as shown by arrow 532.

EMA 120 may then store the encrypted PKDF in a database 512, as shown by arrow 530.

At a future date the password needs to be restored. In this case, server 140 will communicate with EMA 120 through a secure channel. The server 140 may provide a command to obtain the encrypted PKDF, as shown by arrow 550. The EMA 120 retrieves the encrypted PKDF from database 512, as shown by arrow 552 and then provides the encrypted PKDF to server 140 for decryption, as shown by arrow 554.

The server 140 uses its private key to decrypt the encrypted PKDF and provides the unencrypted PKDF back to EMA 120. EMA 120 may then use the unencrypted PKDF to generate the perimeter key to decrypt data and to further reset the password as described above and as shown by arrow 560. The new password can then be used to create a new PKDF and the PKDF can be encrypted and stored in accordance with arrows 522, 530, 532 and 540.

Based on the above, the password is never stored in the clear, nor is the intermediate PKDF value. The private key is required to decrypt the stored encrypted PKDF value and thus even if the device is compromised the data will remain secure.

The PKDF value is, in some embodiments, further hashed with values on the device, meaning that the server cannot drive the decryption key.

In the case of device management, the encrypted PKDF allows the server to change policies and provision without the need for user intervention to enter a password. It also allows for the server to change the policy from requiring a non-local key, to one that does not require a non-local key. System wide security policies could change at the enterprise. When a policy that allows a local key is delivered to the device, the non-local key is migrated to a local key on the device, publishing a new PKDF that is transmitted to EMA. It also allows for the enterprise to switch to a more secure policy, which requires a non-local key. When such a policy is delivered to the device, the software on the device immediately begins the process of migrating the local key to a non-local key on the device. This process requires the user to login to the device, (authenticate themselves) and then these credentials are used to migrate the existing local key to a non-local one. At the end of this migration step, a new PKDF value is published to EMA. In some embodiments, a non-local key is also referred to as a two factor encryption key The above may be implemented by any device. If the above is implemented on a mobile device, one exemplary mobile device capable of implementing the above is shown with regard to FIG. 6.

Mobile device 600 is typically a two-way wireless communication device having data communication capabilities. Mobile device 600 generally has the capability to communicate with other computer systems on the Internet. Depending on the exact functionality provided, the mobile device may be referred to as a data messaging device, a wireless e-mail device, a cellular telephone with data messaging capabilities, a wireless Internet appliance, a wireless device, a mobile device, a game console, a tablet, or a data communication device, as examples.

Where mobile device 600 is enabled for two-way communication, it may incorporate a communication subsystem 611, including both a receiver 612 and a transmitter 614, as well as associated components such as one or more antenna elements 616 and 618, local oscillators (LOs) 613, and a processing module such as a digital signal processor (DSP) 620. As will be apparent to those skilled in the field of communications, the particular design of the communication subsystem 611 will be dependent upon the communication network in which the device is intended to operate.

Network access requirements will also vary depending upon the type of network 619. In some networks network access is associated with a subscriber or user of mobile device 600. A mobile device may require a removable user identity module (RUIM) or a subscriber identity module (SIM) card. The SIM/RUIM interface 644 is normally similar to a card-slot into which a SIM/RUIM card can be inserted and ejected. The SIM/RUIM card can have memory and hold many key configurations 651, and other information 653 such as identification, and subscriber related information.

Figure 6:
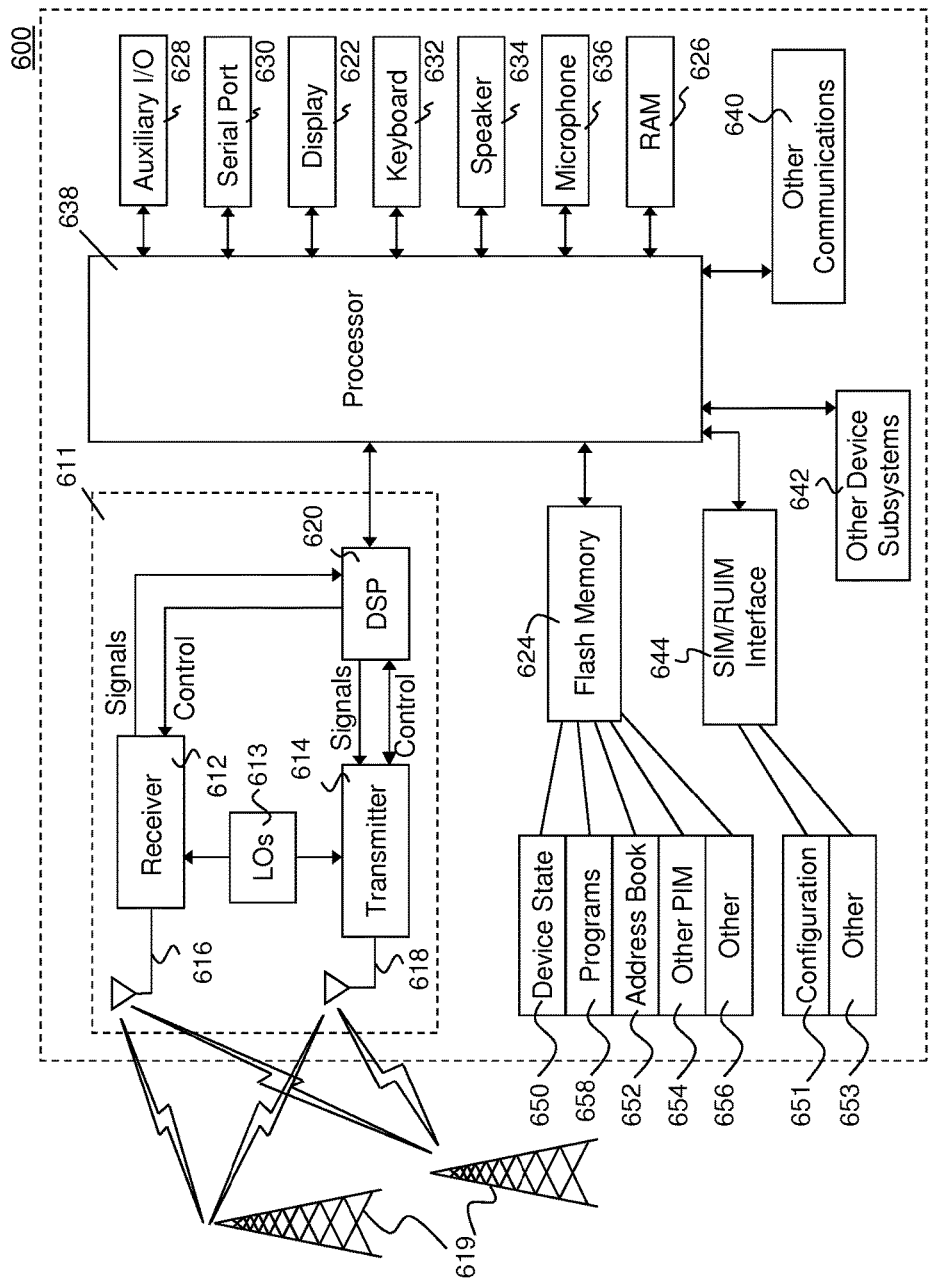
FIG. 6 is a block diagram illustrating a mobile device that can be configured to implement the solutions of the present disclosure.

When required network registration or activation procedures have been completed, mobile device 600 may send and receive communication signals over the network 619. As illustrated in FIG. 6, network 619 can consist of multiple base stations communicating with the mobile device.

Signals received by antenna 616 through communication network 619 are input to receiver 612, which may perform such common receiver functions as signal amplification, frequency down conversion, filtering, channel selection and the like. A/D conversion of a received signal allows more complex communication functions such as demodulation and decoding to be performed in the DSP 620. In a similar manner, signals to be transmitted are processed, including modulation and encoding for example, by DSP 620 and input to transmitter 614 for digital to analog conversion, frequency up conversion, filtering, amplification and transmission over the communication network 619 via antenna 618. DSP 620 not only processes communication signals, but also provides for receiver and transmitter control. For example, the gains applied to communication signals in receiver 612 and transmitter 614 may be adaptively controlled through automatic gain control algorithms implemented in DSP 620.

Mobile device 600 generally includes a processor 638 which controls the overall operation of the device. Communication functions, including data and voice communications, are performed through communication subsystem 611. Processor 638 also interacts with further device subsystems such as the display 622, flash memory 624, random access memory (RAM) 626, auxiliary input/output (I/O) subsystems 628, serial port 630, one or more keyboards or keypads 632, speaker 634, microphone 636, other communication subsystem 640 such as a short-range communications subsystem and any other device subsystems generally designated as 642. Serial port 630 could include a USB port or other port known to those in the art.

Some of the subsystems shown in FIG. 6 perform communication-related functions, whereas other subsystems may provide "resident" or on-device functions. Notably, some subsystems, such as keyboard 632 and display 622, for example, may be used for both communication-related functions, such as entering a text message for transmission over a communication network, and device-resident functions such as a calculator or task list.

Operating system software used by the processor 638 may be stored in a persistent store such as flash memory 624, which may instead be a read-only memory (ROM) or similar storage element (not shown). Those skilled in the art will appreciate that the operating system, specific device applications, or parts thereof, may be temporarily loaded into a volatile memory such as RAM 626. Received communication signals may also be stored in RAM 626. Operating system software may include the PM and EMA modules described above.

As shown, flash memory 624 can be segregated into different areas for both computer programs 658 and program data storage 650, 652, 654 and 656. These different storage types indicate that each program can allocate a portion of flash memory 624 for their own data storage requirements. Processor 638, in addition to its operating system functions, may enable execution of software applications on the mobile device. A predetermined set of applications that control basic operations, including at least data and voice communication applications for example, will normally be installed on mobile device 600 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the mobile device such as, but not limited to, e-mail, calendar events, voice mails, appointments, and task items. Further applications may also be loaded onto the mobile device 600 through the network 619, including games, social media applications, multi-media applications, among others. An auxiliary I/O subsystem 628, serial port 630, short-range communications subsystem 640 or any other suitable subsystem 642, may be used, and the application installed by a user in the RAM 626 or a non-volatile store (not shown) for execution by the processor 638. Such flexibility in application installation increases the functionality of the device and may provide enhanced on-device functions, communication-related functions, or both. For example, secure communication applications may enable electronic commerce functions and other such financial transactions to be performed using the mobile device 600.

In a data communication mode, a received signal such as a text message or web page download will be processed by the communication subsystem 611 and input to the processor 638, which may further process the received signal for output to the display 622, or alternatively to an auxiliary I/O device 628.

A user of mobile device 600 may also compose data items such as email messages for example, using the keyboard 632, which may be a complete alphanumeric keyboard or telephone-type keypad, among others, in conjunction with the display 622 and possibly an auxiliary I/O device 628. Such composed items may then be transmitted over a communication network through the communication subsystem 611.

For voice communications, overall operation of mobile device 600 is similar, except that received signals would typically be output to a speaker 634 and signals for transmission would be generated by a microphone 636. Alternative voice or audio I/O subsystems, such as a voice message recording subsystem, may also be implemented on mobile device 600. Although voice or audio signal output is generally accomplished primarily through the speaker 634, display 622 may also be used to provide an indication of the identity of a calling party, the duration of a voice call, or other voice call related information for example.

Serial port 630 in FIG. 6 would normally be implemented in a personal digital assistant (PDA)-type mobile device for which synchronization with a user's desktop computer (not shown) may be desirable, but is an optional device component. Such a port 630 would enable a user to set preferences through an external device or software application and would extend the capabilities of mobile device 600 by providing for information or software downloads to mobile device 600 other than through a wireless communication network. The alternate download path may for example be used to load an encryption key onto the device through a direct and thus reliable and trusted connection to thereby enable secure device communication. As will be appreciated by those skilled in the art, serial port 630 can further be used to connect the mobile device to a computer to act as a modem.

Other communications subsystems 640, such as a short-range communications subsystem, is a further optional component which may provide for communication between mobile device 600 and different systems or devices, which need not necessarily be similar devices. For example, the subsystem 640 may include an infrared device and associated circuits and components or a Bluetooth™ communication module to provide for communication with similarly enabled systems and devices. Subsystem 640 may further include non-cellular communications such as WiFi or WiMAX, near field communications, among others.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method, at a computing device, for enabling recovery of an encryption key used for encrypting data of an encryption perimeter, the method comprising:
   establishing, with a server, a public/private key pair, the public key being stored on the computing device and the private key being stored on the server;
   using a Password Key Derivation Function (PKDF) for computing a PKDF value, based on a password, at the computing device, the PKDF value being used to derive the encryption key by combining the PKDF value with device specific random data;
   encrypting data within the encryption perimeter on the computing device with the encryption key;
   encrypting the PKDF value with the public key;
   storing the encrypted PKDF value;
   deleting the password and the PKDF value from memory on the computing device;
   establishing a secure channel with the server;
   sending the encrypted PKDF value to the server;
   receiving a decrypted PKDF value from the server; and
   combining the decrypted PKDF value with the device specific random data to derive the encryption key;
   wherein the secure channel is established with cryptographic credentials which are distinct from the password, the PKDF value, and the public and private key pair.

2. The method of claim 1, wherein the encryption key is used for encrypting and decrypting data in the encryption perimeter.

3. The method of claim 1 wherein the PKDF is a one-way hash function.

4. The method of claim 1, wherein the encryption key is derived by applying at least one cryptographic hash iteration to the PKDF value.

5. The method of claim 1, wherein the computing device is one of a smart phone, a tablet, or a personal computer.

6. A method, at a server, for enabling recovery of an encryption key used for encrypting data of an encryption perimeter on a computing device, comprising:
   establishing with the computing device, a public/private key pair, the public key being stored on the computing device and the private key being stored on the server;
   establishing a secure channel with the computing device;

receiving, via the secure channel, an encrypted Password Key Derivation Function (PKDF) value, the PKDF value being based on a password;

decrypting the encrypted PKDF value with the private key; and sending the decrypted PKDF value to the computing device via the secure channel;

wherein the encryption key on the computing device is derivable from the decrypted PKDF value by combining the PKDF value with device specific random data;

wherein data within the encryption perimeter on the computing device is encrypted with the encryption key; and wherein the secure channel is established with cryptographic credentials which are distinct from the password, the PKDF value, and the public and private key pair.

7. The method of claim 6, wherein the PKDF value comprises a hash of a password.

8. The method of claim 6, wherein the private key is uniquely associated with the computing device.

9. The method of claim 6 further comprising, after receiving the encrypted PKDF value, sending a new password to the mobile device via the secure channel.

10. A computing device configured for enabling recovery of an encryption key used for encrypting data of an encryption perimeter, comprising:

a communications subsystem;
a processor; and
memory;

wherein the communications subsystem, the processor, and the memory, cooperate to:

establish, with a server, a public/private key pair, the public key being stored on the computing device and the private key being stored on the server;

use a Password Key Derivation Function (PKDF) for computing a PKDF value, based on a password, at the computing device, the PKDF value being used to derive the encryption key by combining the PKDF value with device specific random data;

encrypt data within the encryption perimeter on the computing device with the encryption key;

encrypt the PKDF value with the public key;
store the encrypted PKDF value;
delete the password and the PKDF value from memory on the computing device;

establish a secure channel with the server;
send the encrypted PKDF value to the server;
receive a decrypted PKDF value from the server; and
combine the decrypted PKDF value with the device specific random data to derive the encryption key;

wherein the secure channel is established with cryptographic credentials which are distinct from the password, the PKDF value, and the public and private key pair.

11. The computing device of claim 10, wherein the encryption key is used for encrypting and decrypting data in the encryption perimeter.

12. The computing device of claim 10 wherein the PKDF is a one-way hash function.

13. The computing device of claim 10, wherein the encryption key is obtained by applying at least one cryptographic hash iteration to the PKDF value.

14. The computing device of claim 10, wherein the computing device is one of a smart phone, a tablet, or a personal computer.

15. A server, configured for enabling recovery of an encryption key used for encrypting data of an encryption perimeter on a computing device comprising:

a communications subsystem;
a microprocessor; and
memory;

wherein the communications subsystem, microprocessor and memory cooperate to:

establish with the computing device, a public/private key pair, the public key being stored on the computing device and the private key being stored on the server;

establish a secure channel with the computing device;
receive, via the secure channel, an encrypted Password Key Derivation Function (PKDF) value, the PKDF value being based on a password;

decrypt the encrypted PKDF value with the private key; and send the decrypted PKDF value to the computing device via the secure channel;

wherein the encryption key on the computing device is derivable from the decrypted PKDF value by combining the PKDF value with device specific random data;

wherein data within the encryption perimeter on the computing device is encrypted with the encryption key; and wherein the secure channel is established with cryptographic credentials which are distinct from the password, the PKDF value, and the public and private key pair.

16. The server of claim 15, wherein the private key is uniquely associated with the computing device.

17. The server of claim 15, wherein the communications subsystem, the microprocessor and the memory further cooperate to, after receiving the encrypted PKDF value, send a new password to the computing device via the secure channel.

18. A non-transitory computer-readable medium having stored thereon executable code for execution by a processor of a computing device, the computing device comprising an encryption perimeter encrypted with an encryption key, the executable code comprising instructions for:

establishing, with a server, a public/private key pair, the public key being stored on the computing device and the private key being stored on the server;

using a Password Key Derivation Function (PKDF) for computing a PKDF value, based on a password, at the computing device, the PKDF value being used to derive the encryption key by combining the PKDF value with device specific random data;

encrypting data within the encryption perimeter on the computing device with the encryption key;

encrypting the PKDF value with the public key;
storing the encrypted PKDF value;
deleting the password and the PKDF value from memory on the computing device;

establishing a secure channel with the server;
sending the encrypted PKDF value to the server;
receiving a decrypted PKDF value from the server; and
combining the decrypted PKDF value with device specific random data wherein the secure channel is established with cryptographic credentials which are distinct from the password, the PKDF value, and the public and private key pair.

19. A non-transitory computer-readable medium having stored thereon executable code for execution by a processor of a server, the executable code comprising instructions for:

establishing with a computing device, a public/private key pair, the public key being stored on the computing device and the private key being stored on the server, the computing device comprising an encryption perimeter encrypted with an encryption key;

establishing a secure channel with the computing device;

receiving, via the secure channel, an encrypted Password Key Derivation Function (PKDF) value, the PKDF value being based on a password;

decrypting the encrypted PKDF value with the private key; and sending the decrypted PKDF value to the computing device via the secure channel;

wherein the encryption key on the computing device is derivable from the decrypted PKDF value by combining the PKDF value with device specific random data;

wherein data within an encryption perimeter on the computing device is encrypted with the encryption key; and wherein the secure channel is established with cryptographic credentials which are distinct from the password, the PKDF value, and the public and private key pair.

\* \* \* \* \*